Nov. 11, 1969        H. S. NEWCOMER        3,477,788
QUADRUPLY-DISPERSIVE MONOCHROMATOR LIGHT-DISPERSING SYSTEM
Original Filed Jan. 20, 1964
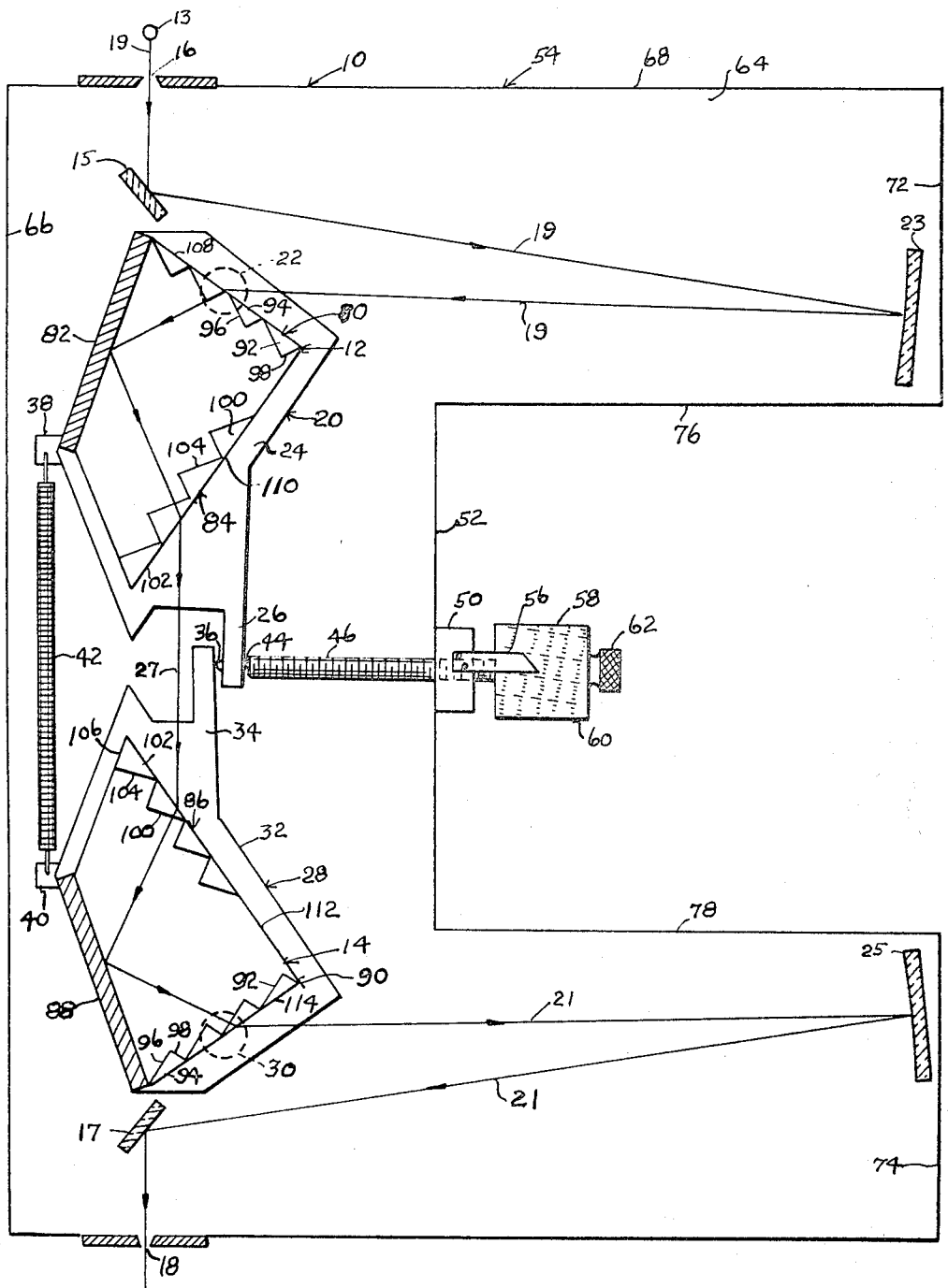
INVENTOR.
HARRY S. NEWCOMER.
BY Barthel & Bugbee
ATTORNEYS.

United States Patent Office 3,477,788
Patented Nov. 11, 1969

3,477,788
QUADRUPLY-DISPERSIVE MONOCHROMATOR LIGHT-DISPERSING SYSTEM
Harry S. Newcomer, P.O. Box 340,
Cape May, N.J. 08204
Original application Jan. 20, 1964, Ser. No. 338,744, now Patent No. 3,428,391, dated Feb. 18, 1969. Divided and this application Jan. 22, 1968, Ser. No. 699,466
Int. Cl. G01j 3/12; G02b 5/04; G02f 7/00
U.S. Cl. 356—100                                6 Claims

ABSTRACT OF THE DISCLOSURE

This monochromator employs two paired prism-and-mirror array units 12 and 14 adjacent the entrance slit 16 and exit slit 18 respectively and effect quadruple dispersion of the incident light beam. Each such array is mounted on a rotary prism table pivoted upon a vertical pivot shaft. The two prism tables are adjusted simultaneously to rotate around their respective pivot shafts by means of a single micrometer adjusting screw. This invention dispenses with the need for the prior solid prisms known in the optical art as Pellin-Broca prisms and eliminates their long internal optical paths resulting in excessive light absorption, and also eliminates their massive forms with the correspondingly high cost of their prism material.

---

This is a division of my co-pending application Ser. No. 338,744 filed Jan. 20, 1964, now U.S. Patent No. 3,428,391, for Multiple Prism Light Dispersing Unit Monochromators.

The drawing is a top plan view of a constant-deviation quadruple-dispersive monochromator illustrated in diagrammatic form to simplify the showing.

The quadruply dispersive monochromator 10, shown in the drawing supersedes prior monochromators equipped with two solid Pellin-Broca prisms having roughly the outline and dimensions of the two prism structures shown in the drawing but employing massive solid prisms. Such prior solid Pellin-Broca prisms have such long optical paths and are so massive as to preclude their use where there is material light absorption or substantial cost of the prism material. In my invention shown in the drawing, I replace the two massive solid Pellin-Broca prisms by two paired prism-and-mirror array units, generally designated 12 and 14, situated and oriented adjacent the entrance slit 16 and exit slit 18 respectively. The entrance slit 16 is adjacent a suitable light source 13. Fixedly mounted adjacent the entrance and exit slits 16 and 18 are entrance and exit slit mirrors 15 and 17 which reflect incident and emergent beams 19 and 21 collimated by incident and emergent collimating mirrors 23 and 25 respectively. The incident beam 19 emerges from the entrance prism array unit 12 as the intermediate beam 27 and continues onward to the exit prism array unit 14, from which it emerges as the emergent beam 21. The entrance prism-and-mirror array unit 12 is mounted on a rotary prism table 20 pivoted upon a vertical pivot shaft 22 and having a main table portion 24 approximating the outline of a solid massive Pellin-Broca prism and an arm 26 projecting therefrom toward the opposite or exit prism-and-mirror array unit 14.

The exit prism-and-mirror array unit 14 is mounted upon a similarly-shaped rotary prism table, generally designated 28, pivoted upon a vertical pivot shaft 30 and of similar outline and similarly possessing a main table portion 32 and an arm 34 projecting toward the entrance prism-and-mirror array unit 12 and its table 20 and slightly overlapping its arm 26. Contact between the arms 26 and 34 is made by a contact ball 36 projecting rearwardly from the arm 26. The rotary prism tables 20 and 28 are additionally provided with rearwardly-projecting spring anchorage arms 38 and 40 disposed approximately parallel to one another and drilled to receive the opposite end loops of a tension spring 42. The spring 42 tends to rotate the entrance and exit prism tables 20 and 28 around their respective shafts 22 and 30 in opposite directions toward one another so that the arm 34 is constantly urged into contact with the arm 26 and the arm 26 into contact with the ball point 44 on the inner end of a screw shaft 46 disposed with its axis parallel to the collimated incident beam 19 and passing through a stationary internally-threaded nut 50.

The nut 50 is secured to the main front wall 52 of the monochromator housing, casing or box, generally designated 54, and carries an index pointer 56 registering with the helical graduated wave-length scale 58 on a wave length drum 60 mounted on the outer end of the screw shaft 46 and rotated by means of a knurled knob 62 integral therewith. The monochromator box 54 has a bottom wall 64 in which the prism table pivot shafts 22 and 30 are journalled, a rear wall 66, opposite outer side walls 68 and 70 on which the entrance and exit slits 16 and 18 are mounted, extension front walls 72 and 74, and opposite inner side walls 76 and 78 respectively connecting the extension front walls 72 and 74 to the main front wall 52.

The entrance prism-and-mirror array unit 12 includes an initial prism array 80, and intermediate front surface plane mirror 82, and a final prism array 84, whereas the exit prism-and-mirror array unit 14 similarly includes an initial prism array 86 similar to the final prism array 84, an intermediate front surface plane mirror 88 and final prism array 90 similar to the initial prism array 80. Each initial prism array 80 and final prism array 90 consists of individual 30° right-angle prisms 92 having slant faces 94 and altitude faces 96 disposed at right angles to base or blind faces 98. Similarly, the final prism array 84 and initial prism array 86 include individual 30° right-angle prisms 100 having slant faces 102 and altitude faces 104 disposed at right angles to blind or base faces 106. The slant faces 94 of the initial prism array 80 are disposed in a common entrance plane face 108 whereas the slant faces 102 of the final prism array 84 are disposed in a common exit plane face 110. Similarly, the slant faces 102 of the prism array 86 are disposed in a common entrance plane face 112, whereas the slant faces 94 of the prisms 92 in the final prism array 90 are disposed in a common exit plane face 114.

In the quadruple dispersive monochromator 10 of this invention, which is a constant deviation monochromator the distances of the concave spherical collimating mirrors 23 and 25 from their respective prism-and-mirror array units 12 and 14 are shown shorter than such distances might be in an actual instrument, in order to enable the showing of the parts on a larger scale and to accommodate the instrument within the single sheet of drawing, or if parabolic surfaces are used they can be as shown. The entrance and exit slits 16 and 18 have been shown in simplified form rather than adjustable, in order to avoid complicating the showing. The slit mirrors 15 and 17 and the collimating mirrors 23 and 25 are mounted on the bottom wall 64.

In the operation of the quadruple dispersive monochromator 10, an incident beam, represented by its principal ray 19, is reflected by the entrance slit mirror 15 and proceeds to the collimating mirror 23 located at its focal distance from the entrance slit 16, when the collimated beam is reflected in parallel rays impinging upon the common face 108 of the initial prism array 80 of the entrance prism-and-mirror array unit 12, refraction at the slant faces 94 of the individual prisms 92 causing them to pass through the altitude faces 96 undeviated by reason of their normal incidence thereon, reflected at right angles at the front surface intermediate mirror 82, and then passing undeviated through the altitude faces 104 of the prisms 100 in the array 84, and refracted and dispersed at the slant faces 102 thereof in their common plane face 110 so as to emerge as the intermediate beam 27 at right angles to the incident collimated beam 19 from the collimating mirror 23. The thus-dispersed intermediate beam 27 enters the slant faces 102 of the prisms 100 of the array 86 at their common plane face 112, is refracted and dispersed thereby and passes undeviated through the altitude faces 104 of the prisms 100, is reflected at right angles at the front surface intermediate mirror 88, passes at normal incidence through the altitude faces 96 of the prisms 92 of the prism array 90, is refracted and again dispersed at the slant faces 94 thereof aligned in the common plane face 114, emerges as the emergent beam 21, and remains collimated and is again reflected at the spherical mirror 25, so as to be focussed onto the exit slit 18 via the exit slit mirror 17 and passes through the exit slit 18 as the quadruply-refracted and dispersed emergent beam 21 which is parallel to the incident beam 19.

The configuration of the Pellin-Broca structures 12 and 14 is completely defined by the corner angles which are, beginning at that nearest the slit mirror 15 and reading counterclockwise, respectively 75°, 135°, 60° and 90°. The dimensions of the prism arrays are determined by the aperture of the collimating mirror 23, which is equal to or slightly smaller than the aperture of the exit collimating mirror 25. The orientation of the units 12 and 14 and the incidence angle between the incident ray 19 and the normal to the common plane surface 108 is a function of the index of refraction of the material of which the individual prisms 92 and 100 of the arrays 80, 84, 86 and 90 are composed for the wave length of the light being brought to a focus in the exit slit 18. The wave length of the light emergent in the beam 21 is varied by rotating the wave length drum 60 by the knob 62 so as to bring the desired wave length on the graduated wave length scale 58 in alignment with the index pointer 56. The rotation of the knob 62 at the same time rotates the screw shaft 46 within the nut 50, thereby swinging the arm 26 of the prism table 20 and with it the arm 34 of the prism table 28, thus rotating the prism-and-mirror array units 12 and 14 by equal angular increments in opposite directions of rotation around their respective pivot shafts 22 and 30.

The monochromator of the present invention has the advantage of greatly decreased ultra-violet absorption by using small multiple prisms in prism arrays of simple construction, as set forth above. Its efficiency is therefore far above the efficiency of prior monochromators with a large single prism or with two large single prisms in train. Moreover, because of the size of single large Pellin-Broca prisms and their consequently high cost when incorporated in an instrument corresponding to that shown in the drawing, such an instrument with conventional quartz prisms is hardly practical.

In the foregoing description it has been assumed that the solid prism substitution would have the same face or aperture, although this would not be practical because of coma unless the collimating means were aspheric. There is at least a 20% advantage here for the prism array. The foregoing advantages for the prism array are impressive either as to relative performance or for equivalent performance at very much reduced cost when the comparison is for the expensive material in the conventional instrument only. These advantages increase as the dispersion of the instrument is increased through complexity of design and particularly as low wave lengths are approached.

I claim:
1. A light-dispersing system for a monochromator, comprising
   a pair of prism array supports pivotally mounted in laterally-spaced relationship upon parallel pivot elements,
   means for simultaneously rotating said supports in opposite directions around their respective pivot elements,
   and a prism-and-mirror array unit mounted on each prism support for rotation bodily therewith,
      each array unit including
         a first prism array having a multiplicity of individual dispersing prisms mounted side-by-side with their initially-refracting faces disposed in approximately co-planar alignment forming a common face for the incident light,
         a mirror mounted at an acute angle to said common face for reflecting light refracted by said first prism array,
         and a second prism array mounted to receive light reflected by said mirror and having a multiplicity of individual dispersing prisms mounted side-by-side with their finally-refracting faces disposed in approximately coplanar alignment forming a common face for the light refracted thereat,
            the prism arrays of each array unit being so oriented that the light leaving the first array unit is substantially perpendicular to the light incident thereto and enters the second array unit in a path substantially perpendicular to the light leaving the second array unit.

2. A light-dispersing system, according to claim 1, wherein the apex angles of said individual prisms are approximately thirty degree angles.

3. A light-dispersing system, according to claim 1 wherein each of said mirrors is a plane mirror positioned to receive light emerging perpendicular to the nearer faces of the prisms of the first array and to reflect said light perpendicularly to the nearer faces of the prisms of the second array.

4. A light-dispersing system, according to claim 1, wherein said support rotating means includes portions projecting from said supports toward one another in overlapping relationship and adjusting mechanism for simultaneously moving said overlapping projecting portions back and forth around their respective pivot elements while sliding radially past one another.

5. A light-dispersing system, according to claim 4, wherein said adjusting mechanism includes a precision screw and nut device operatively engaging one of said projecting portions.

6. A light-dispersing system for a monochromator, comprising
   a supporting structure,
   a prism array support,
   a pivot element mounting said prism array support on said supporting structure,
   means for rotating said support in opposite directions around its pivot element,
   and a prism-and-mirror array unit mounted on said prism support for rotation bodily therewith,
      said array unit including
         a first prism array having a multiplicity of individual dispersing prisms mounted side-by-side with their initially-refracting faces disposed in approximately co-planar alignment forming a common face for the incident light, a mirror mounted at an acute angle to said common face for reflecting light refracted by said first prism array, and a second prism array mounted to receive light reflected by said mirror and having a multiplicity of individual dispersing prisms mounted side-by-side with their finally-refracting faces disposed in approximately coplanar alignment forming a common face for the light refracted thereat.

References Cited

UNITED STATES PATENTS

| | | | |
|---|---|---|---|
| 2,652,742 | 9/1953 | Walsh | 356—99 X |
| 2,871,757 | 2/1959 | Walsh | 356—99 X |
| 3,254,556 | 6/1966 | Staunton | 356—99 X |

RONALD L. WIBERT, Primary Examiner

F. L. EVANS, Assistant Examiner

U.S. Cl. X.R.

350—168, 287